United States Patent [19]
Friede et al.

[11] Patent Number: 4,955,045
[45] Date of Patent: Sep. 4, 1990

[54] PLASMA X-RAY TUBE, IN PARTICULAR FOR X-RAY PREIONIZATION OF GAS LASERS AND METHOD FOR PRODUICNG X-RADIATION WITH SUCH AN X-RAY TUBE

[75] Inventors: Dirk Friede, Herzogenaurach; Hans-Juergen Cirkel, Uttenreuth; Rudolf Baumgartl, Alzenau-Hörstein; Matthias Schmutzler, Aschaffenburg, all of Fed. Rep. of Germany

[73] Assignee: Siemens Aktiengesellschaft, Munich, Fed. Rep. of Germany

[21] Appl. No.: 335,700

[22] Filed: Apr. 10, 1989

[30] Foreign Application Priority Data

Apr. 8, 1988 [DE] Fed. Rep. of Germany ....... 3811818
Feb. 14, 1989 [DE] Fed. Rep. of Germany ....... 3904417

[51] Int. Cl.$^5$ ............................................. H01J 35/00
[52] U.S. Cl. .................................... 378/122; 378/119; 315/111.31
[58] Field of Search ....................... 378/119, 122, 136; 315/111.31

[56] References Cited

U.S. PATENT DOCUMENTS 3,970,892 7/1976 Wakalopulos .

OTHER PUBLICATIONS

Appl. Phys. Lett. 34(8), Apr. 15, 1979, pp. 505–508 (S. Lin and J. I. Levatter); "X-Ray Preionization for Electric Discharge Lasers".
Applied Physics Letters, vol. 2, No. 12, of Juhe 15, 1963, pp. 233, 234 (G. W. McClure); "Low-Pressure Glow Discharge".

*Primary Examiner*—Craig E. Church
*Attorney, Agent, or Firm*—Herbert L. Lerner; Laurence A. Greenberg

[57] ABSTRACT

A plasma X-ray tube with high electron current densities includes a plasma chamber formed of a metal hollow cathode having an outer limiting wall with an X-ray target and a mutually spaced apart and opposed inner limiting wall with at least one metal acceleration grid being highly transparent to electron and ion radiation and being in alignment with the X-ray target defining a path. At least one ignition electrode in the form of a thin wire protrudes into the plasma chamber at positive potential relative to the hollow cathode. At least one anode retained in an insulated and gas-tight manner in one of the side walls of the hollow cathode is disposed laterally of the alignment of the target and grid and at positive potential relative to the hollow cathode. An acceleration chamber adjoins and communicates with the plasma chamber through the acceleration grid. The acceleration chamber is surrounded by metal walls in electrical and gas-tight connection with the limiting walls of the hollow cathode. An acceleration cathode is at high negative potential relative to the acceleration grid. The acceleration cathode has a shaft and a head in alignment with the path and spaced apart from the acceleration grid. The shaft of the acceleration cathode is retained in an insulating gas-tight duct in a wall facing the acceleration grid.

18 Claims, 2 Drawing Sheets

PLASMA X-RAY TUBE, IN PARTICULAR FOR X-RAY PREIONIZATION OF GAS LASERS AND METHOD FOR PRODUICNG X-RADIATION WITH SUCH AN X-RAY TUBE

SPECIFICATION

The invention relates to a plasma X-ray tube having high electron current densities, in particular for X-ray preionization of gas lasers.

It is known to construct electron guns as a structural unit that can be built onto or flanged to a laser chamber pumped by high-voltage electric discharge. The electron beam strikes a foil which partitions off the volume of the electron gun unit from that of the laser chamber, and the bremsstrahlung (braking radiation) triggered by the impact of the electrons on the thin metal foil serves to preionize the discharge volume of the laser chamber. In this regard see Applied Physics Letter 34 (8), Apr. 15, 1979, pp. 505–508 (S. Lin and J. I. Levatter: "X-Ray Preionization for Electric Discharge Lasers".

The invention is based on the following existing problem: In generating X-ray bremsstrahlung to preionize pulsed gas discharges, for instance in the special case of a high-power laser with a large discharge volume $450 \times 40 \times 56$ mm$^3$ in size, for instance, a very high level of operational reliability is crucial. High electron current densities must be generated on a large-area beam cross-section, in order to bring about a corresponding large-area beam cross section of the bremsstrahlung or X-radiation. The X-ray preionization unit must be highly reliable and must assure operation at high repetition rates, and the intensity of the X-ray emitted by the target must suffice to furnish the required high starting electron density between the electrodes for a homogeneous high-pressure thermionic discharge in the laser gas. Furnishing this starting electron density must be effected within a narrow time window prior to the ignition of the primary laser discharge. Cold emission tubes do not meet these requirements, because their service life in continuous operation at high repetition rates is limited (due to dulling of the blade-like electrode, causing marked fluctuation in the distribution of the intensity of the X-radiation). The thermal load on the cold emission cathode leads to sputtering, which as noted can cause dulling of the blade.

It is accordingly an object of the invention to provide a plasma x-ray tube, in particular for x-ray preionization of gas lasers and a method for producing x-radiation with such an x-ray tube, which overcome the hereinafore-mentioned disadvantages of the heretofore-known methods and devices of this general type, which has a substantially longer service life by comparison with cold emission tubes, with which high electron current densities with a large-area beam cross section can be furnished, in particular for X-ray preionization of gas lasers, and more particularly for pulsed operation, and in which sufficiently high charge carrier densities must be available in the shortest possible time in the discharge volume of the plasma W-ray tube. In particular, the plasma X-ray tube should be suitable for pulsed operation with transversely excited lasers (TE lasers), and above all for excimer lasers.

With the foregoing and other objects in view there is provided, in accordance with the invention, a plasma X-ray tube with high electron current densities, especially for the x-ray preionization of gas lasers, comprising a plasma chamber formed of a metal hollow cathode, preferably at ground potential, having mutually spaced apart and opposed inner and an outer limiting walls and size walls, the outer wall having an X-ray target in the form of a thin-metal foil or a vapor-deposited film and the inner wall having at least one metal acceleration grid being highly transparent to electron and ion radiation and being in alignment with the X-ray target defining a path therebetween; at least one ignition electrode in the form of a thin wire protruding into the plasma chamber at positive potential relative to the hollow cathode; at least one anode retained in an insulated and gas-tight manner in one of the side walls of the hollow cathode, the at least one anode being disposed laterally of the alignment of the X-ray target and the acceleration grid and at positive potential relative to the hollow cathode; an acceleration chamber adjoining and communicating with the plasma chamber through the acceleration grid, the acceleration chamber being surrounded by metal walls in electrical and gas-tight connection with the limiting walls of the hollow cathode and a wall facing the acceleration grid, and an acceleration cathode at high negative potential relative to the acceleration grid, the acceleration cathode having a shaft and having a head being in alignment with the path between the X-ray target and the acceleration grid and being spaced apart from the acceleration grid, and an insulating gas-tight duct in the wall facing the acceleration grid in which the shaft of the acceleration cathode is retained.

In accordance with another feature of the invention, the plasma chamber and the acceleration chamber are in the form of a grounded housing of metal on all sides.

In accordance with a further feature of the invention, the hollow cathode is formed of nickel and/or aluminum, especially aluminum walls having an inner surface coated with nickel.

In accordance with an added feature of the invention, the acceleration cathode is formed of at least one material from the group consisting aluminum, nickel and/or copper beryllium.

In accordance with an additional feature of the invention, there is provided at least one operating gas component besides helium, from the group consisting of neon and/or $H_2$, for example, at a gas pressure in the range from approximately 2–10 Pa.

In accordance with yet another feature of the invention, the X-ray target is formed of a thin layer or foil of a material having a high atomic number, such as gold or uranium.

In accordance with yet a further feature of the invention, the target is an electron-transparent outlet slit of an electron gun formed by the plasma X-ray tube.

With the object of the invention in view, there is also provided a method for generating X-radiation, in a plasma X-ray tube with high electron current densities including a plasma chamber formed of a metal hollow cathode with an X-ray target and a metal acceleration grid, an ignition electrode and an anode in the plasma chamber, an acceleration chamber, and an acceleration cathode in the acceleration chamber, which comprises varying acceleration voltage and current by varying current in the hollow cathode and gas pressure, without changing their electrical excitation data.

The advantages attainable with the invention are above all high intensity of the X-ray bremsstrahlung and good homogeneity of the radiation distribution, while additionally taking the absorption ratios in the X-ray slit and in the laser gas into account, so that an adequate preionization density can be attained. These values can be optimized with the method described above.

In accordance with a concomitant mode of the invention, there is provided a method which comprises effecting both low-pressure gas discharges (ignition wire discharge and hollow cathode discharge) and acceleration of charge carriers in pulsed operation. In such pulsed operation, the duration of an X-ray pulse is approximately 50 ns FWHM (FWHM=duration at half-maximum). The current density of the pulsed electron beam, the retardation of which in a material having a high atomic number leads to the emission of W-ray bremsstrahlung amounts, for instance to 5 to 10 A/cm$_2$ at an acceleration voltage of a maximum of 60 to 120 kV, and these data are substantially dictated by the properties of the high-voltage generator that supplies the tubes. In contrast to cold emission, according to the invention the thermal load on the cathode surface is much lower and has virtually no effect on the physical principle of electron generation, in the sense of shortening the service life. Moreover, as noted, the gas pressure and plasma density provide opportunities for varying the tube performance.

Although U.S. Pat. No. 3,970,892 does disclose an ion plasma electron gun that functions with an ignition wire and a hollow cathode discharge in order to generate charge carriers in the plasma chamber, in that apparatus the hollow cathode anode is embodied as an isolatedly mounted grid, which covers the cross section of the electron beam in addition to the acceleration anode grid. That configuration is not as favorable in terms of the electron current density, because of the double grid construction. Moreover, the isolatedly disposed hollow cathode anode grid is more expensive both electrically and mechanically.

Other features which are considered as characteristic for the invention are set forth in the appended claims.

Although the invention is illustrated and described herein as embodiment in a plasma x-ray tube, in particular for x-ray preionization of gas lasers and method for producing x-radiation with such an x-ray tube, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
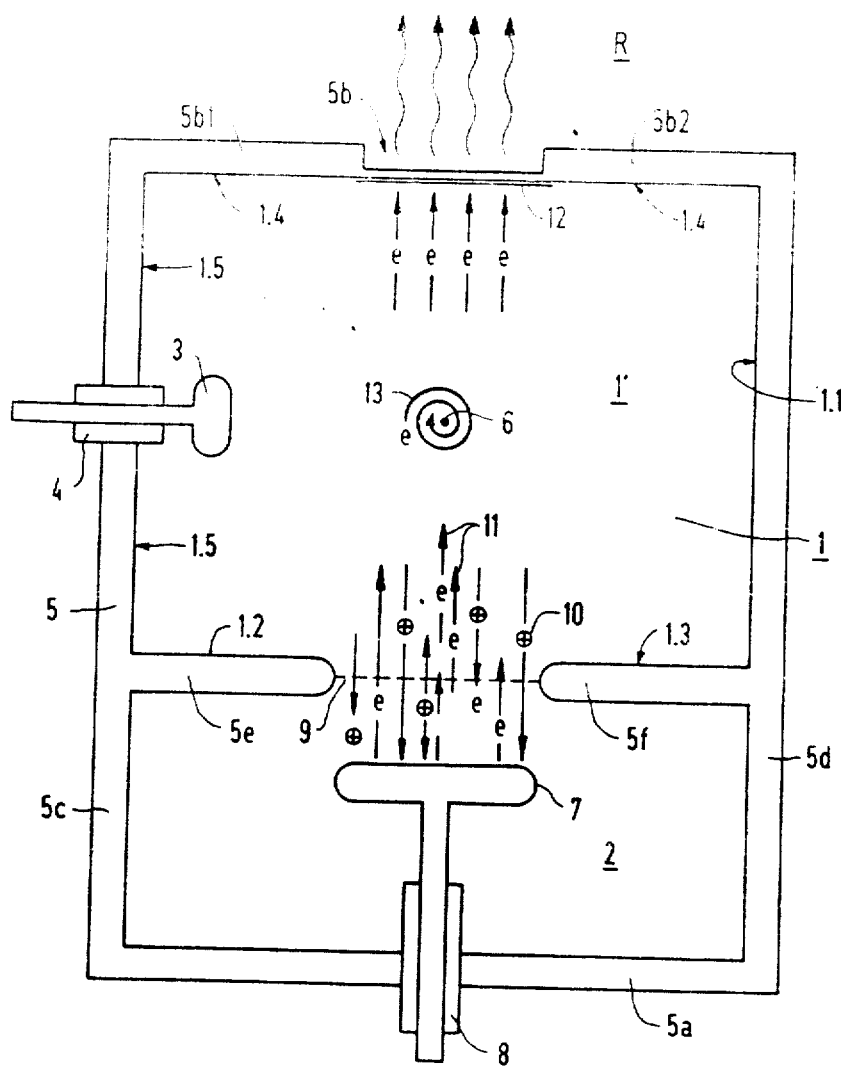
FIG. 1 is a diagrammatic, cross-sectional view of a plasma X-ray tube, which may have a length of one-half meter (perpendicular to the plane of the drawing), for instance.

Referring now to the figures of the drawings in detail and first, particularly, to FIG. 1 thereof, there is seen a fundamental geometrical structure of an X-ray tube R, being formed of two chambers, namely a plasma chamber 1 and an acceleration chamber 2, divided from one another by a highly-transparent grid 9.

Figure 2:
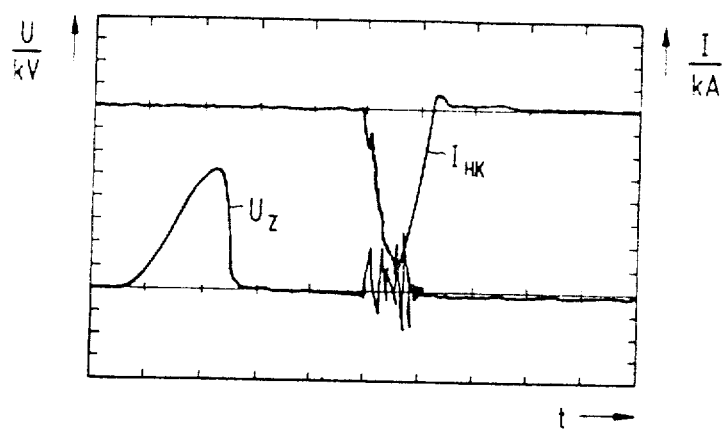
FIG. 2 is a diagram plotting the course of the voltage $U_Z$ at the ignition wire and to the hollow cathode current $I_{HK}$ over the time axis t, by using two ordinate axes, one with the voltage U shown in kV and the other with the current I shown in kA.

In the first chamber, the plasma chamber 1, a gas discharge is ignited at low partial pressure and a plasma forms by means of this discharge. The discharge form of a hollow cathode discharge permits high current amplification, and thus makes it possible to furnish high charge carrier densities in the low-pressure range. A hollow cathode 1' is formed of the entire inside surfaces 1.1-1.4 and most of the inside surface 1.5 of the first chamber 1, except for regions of the inside surface 1.5 near an anode 3. Thus the hollow cathode 1' encloses virtually the entire solid or dihedral angle. The anode 3 is introduced laterally into the cathode chamber 1 and is electrically supplied through an insulating duct 4 in a cathode wall or elongated housing 5. The spacing of the anode 3 from the surrounding wall 5 is dimensioned in such a way that no sparkover can occur in this region. This special disposition of the anode 3 represents a substantial advantage as compared with the prior art construction of U.S. Pat. No. 3,970,892, in which the anode, in the form of a grid, is disposed in front of the acceleration grid, as seen in FIG. 2 of that patent. Due to the lateral disposition of the anode 3 inside the hollow cathode 1' and its construction as a solid element, the following advantages are attained:

higher efficiency, because an attenuation of the secondarily generated electron beam from the influence of the anode grid is avoided;

higher thermal load capacity of the solid anode; and simpler mechanical construction.

With the specified geometry, an initial concentration of charge carriers is necessary in order to assure reliable ignition of the hollow cathode discharge and the most uniform possible distribution of the current density over the entire cathode surface. This starting plasma is furnished by the discharge of a thin wire 6, which is deployed across the inside of the hollow cathode 1' and supplied electrically through a non-illustrated insulated duct. Both this ignition wire discharge and the hollow cathode discharge are operated in pulsed fashion.

In the second chamber, the acceleration chamber 2, acceleration action on the part of charge carriers lead to the generation of a high-energy electron beam. A high negative potential is applied at an elongated electrode 7, through a high-voltage-insulated duct 8 extended through a wall 5a. The acceleration of the charge carriers is effected in pulsed fashion (in contrast to the aforementioned U.S. patent), as dictated by the requirements for preionization of a discharge-pumped excimer laser. The spacing between the acceleration cathode 7 and the acceleration grid 9 is selected in such a way at the low operating pressure of the tube, no sparkover takes place. Ions 10 from the low-pressure plasma of the first chamber reach the field of the acceleration cathode 7 through the highly transparent grid 9 and are accelerated toward the cathode surface. In accordance with their kinetic energy, upon impact with the cathode, they emit secondary electrons 11. The secondarily generated electrons are then accelerated in turn toward the grid 9 and pass through the plasma chamber 1 to reach an X-ray target 12. Their mean free path length is longer than the housing dimensions, so that any losses in intensity and energy resulting from any impact events are quite low. The elongated housing 5 has a rectangular cross section, side walls 5c, 5d, a target wall 5b with wall portions 5b1 and 5b2 and the wall 5a retaining the cathode 7. The layer or film thicknesses of the target and X-ray slit 12 are dimensioned in such a way that losses in X-ray intensity from absorption are kept small, and the pressure difference relative to the atmosphere, or to the pressure in the laser, is properly accounted for. Shielding walls 5e, 5f extending inward from the side walls 5c and 5d, respectively, shield the plasma chamber 1 from the acceleration chamber 2, except for the cross-sectional area of the grid 9, corresponding to the cross-sectional area of the head of the cathode 7. Tests have shown that X-ray tubes functioning according to the illustrated principle prove suitable for the preionization of excimer lasers. The three-dimensional extent of the tubes is adapted to the dimensions of the volumes to be ionized. The intensity and spectral energy distribution of the X-ray bremsstrahlung (braking radiation) are selected in accordance with the goal of adequate preionization density in the laser gas. The distribution of intensity over the target area meets the requirement for homogeneous preionization of the active laser volume.

Figure 3:
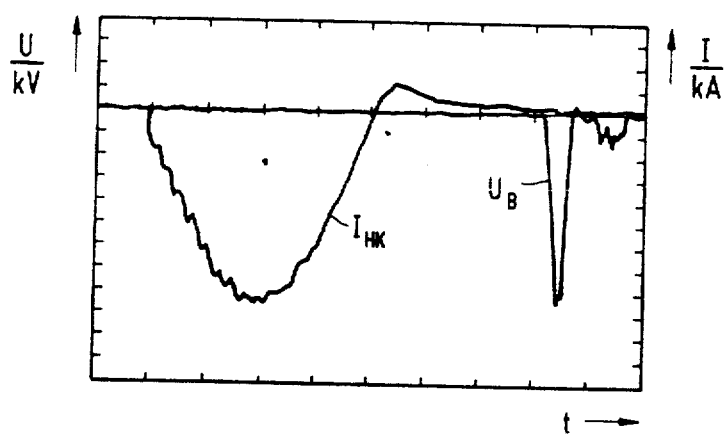
FIG. 3 is a corresponding diagram showing a time slide of the course of the hollow cathode current $I_{HK}$ and of the acceleration voltage $U_B$.
Figure 4:
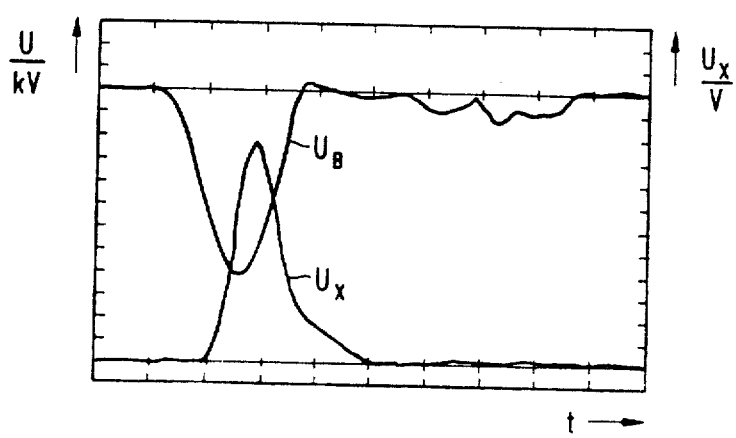
FIG. 4 is a diagram showing the course of the acceleration voltage $U_B$ and the X-ray amplitude $U_X$ over the time axis, with the dimension U in kV applying to both variables $U_B$ and $U_X$.

The diagrams of current and voltage curves shown in FIGS. 2–4 illustrate the mode of operation of the tube in chronological sequence: FIG. 2 is a diagram having the ordinate axis U in kV and the ordinate I in kA, which plots the voltage $U_Z$ at the ignition wire and the discharge current $I_{HK}$ (kA) of the hollow cathode discharge over the time axis t. If a positive voltage is applied, an electrical field develops around the wire. Under its influence, electrons present because of ambient radiation are forced to take long paths. The probability of the ionization of gas atoms increases; electron avalanches develop and cause the ignition of the wire discharge. The ignition delay is substantially dependent on the field intensity and gas pressure.

The instant for the electrical triggering of the hollow cathode discharge is selected by means of an electronic control unit in such a way that the ignition wire discharge in each case will already have occurred. The discharge current intensities of the hollow cathode discharge are much greater than those of the ignition wire discharge.

FIG. 3 is a corresponding diagram showing the hollow cathode current $I_{HK}$ and acceleration voltage $U_B$. The instant for the onset of the acceleration voltage can likewise be specified through electronic control means. It is related to the instant of ignition of the laser discharge. Typically, the acceleration voltage for the electron beam is between 60 and 120 kV at a current density of approximately 5 to 10 A/cm$^2$. The half-life width of the X-ray pulse is 50 to 100 ns. In FIG. 4, the course of $U_B$ and of the X-ray amplitude $U_X$ are plotted over the times axis t.

The plasma X-ray tube furnishes X-ray intensities comparable to cold emission tubes, but has substantially more constant operating conditions, with much longer service life.

The mode of operation can be summarized as follows: After the application of a positive voltage pulse to the ignition wire 6, free electrons located in the gas volume fly along spiral paths 13 toward the thin wire. While on its coiled flight path, the electron traverses a path length longer than the mean free path length for impact ionization, and thus generates additional charge carriers. A high-voltage pulse that is applied to the hollow cathode anode 3, in interaction with the metal walls 1.1–1.5 of the discharge vessel or housing 5, increases the charge carrier density in the plasma of the hollow cathode chamber or plasma chamber 1. The negative high-voltage pulse aimed at the solid, elongated acceleration cathode 7 aspirates positive ions out of the hollow cathode chamber 1 through the grid 9, and these ions knock electrons out of the metal, upon impact on the cathode 7. The electrons are emitted by the cathode 7, accelerated toward the grid 9, and shot through the drift or plasma chamber 1 at the X-ray target 12. The gas pressure in the X-ray tube R is set in such a way that the accelerated electrons on their rectilinear path do not suffer additional impact events, and upon their impact on the X-ray target 12 emit the bremsstrahlung characteristic for the acceleration voltage.

It should also be noted that the acceleration of the charge carriers within the acceleration chamber 2 takes place only in the portion of the chamber between the head of the acceleration cathode 7 and the grid 9. For the sake of simplicity, however, the entire chamber surrounding the acceleration cathode, located within the wall portions 5a, 5c, 5e, 5f, 5d, and the grid 9 are referred to herein as the acceleration chamber. The grid 9 is a fine-mesh wire grid with a transparency of 75%, for example. It may be made of molybdenum. Suitable metals for the hollow cathode 1' are nickel or aluminum. Generally, the walls of both the hollow cathode 1' and the acceleration chamber 2 may be formed of aluminum, which is lined with a coating of nickel on the inner surfaces of the walls. The following metals or metal alloys can be considered for the acceleration cathode 7: aluminum and/or nickel and/or copper beryllium. A favorable spacing between the head of the acceleration cathode 7 and the grid is 2 to 3 cm. A preferred pressure range for the plasma chamber 1 and for the acceleration chamber communicating with it is approximately 2 to 10 Pa (approximately equivalent to 20 to 80 mTorr). At this negative pressure, a gas filling of helium is used. Other gases, such as neon or $H_2$, can also be used as the operating gas.

The foregoing is a description corresponding in substance to German Application No. P 39 04 417.3, dated Feb. 14, 1989, the International priority of which along with the International priority of German Application No. P 38 11 818.11, dated Apr. 8, 1988 is being claimed for the instant application, and which is hereby made part of this application. Any material discrepancies between the foregoing specification and the aforementioned corresponding German application are to be resolved in favor of the latter.

We claim:

1. Plasma X-ray tube with high electron current densities, comprising
   (a) a plasma chamber formed of a metal hollow cathode having mutually spaced apart and opposed inner and an outer limiting walls and side walls, said outer wall having an X-ray target and said inner wall having at least one metal acceleration grid being highly transparent to electron and ion radiation and being in alignment with said X-ray target defining a path therebetween;
   (b) at least one ignition electrode in the form of a thin wire protruding into said plasma chamber at positive potential relative to said hollow cathode;
   (c) at least one anode retained in an insulated and gas-tight manner in one of said side walls of said hollow cathode, said at least one anode being disposed laterally of said alignment of said X-ray target and said acceleration grid and at positive potential relative to said hollow cathode;

(d) an acceleration chamber adjoining and communicating with said plasma chamber through said acceleration grid, said acceleration chamber being surrounded by metal walls in electrical and gas-tight connection with said limiting walls of said hollow cathode and a wall facing said acceleration grid, and an acceleration cathode at high negative potential relative to said acceleration grid, said acceleration cathode having a shaft and having a head being in alignment with said path between said X-ray target and said acceleration grid and being spaced apart from said acceleration grid, and an insulating gas-tight duct in said wall facing said acceleration grid in which said shaft of said acceleration cathode is retained.

2. Plasma X-ray tube according to claim 1, wherein said metal hollow cathode is at ground potential.

3. Plasma X-ray tube according to claim 1, wherein said X-ray target is in thin-metal foil.

4. Plasma X-ray tube according to claim 1, wherein said X-ray target is a vapor-deposited film.

5. Plasma X-ray tube according to claim 1, wherein said plasma chamber and said acceleration chamber are in the form of a grounded housing of metal on all sides.

6. Plasma X-ray tube according to claim 1, wherein said hollow cathode is formed of nickel.

7. Plasma X-ray tube according to claim 1, wherein said hollow cathode is formed of aluminum.

8. Plasma X-ray tube according to claim 1, wherein said hollow cathode is formed of nickel and aluminum.

9. Plasma X-ray tube according to claim 1, wherein said hollow cathode is formed of aluminum walls having an inner surface coated with nickel.

10. Plasma X-ray tube according to claim 1, wherein said acceleration cathode is formed of at least one material from the group consisting aluminum, nickel and copper beryllium.

11. Plasma X-ray tube according to claim 1, including at least one operating gas component from the group consisting of helium, neon and $H_2$ at a gas pressure in the range from approximately 2–10 Pa.

12. Plasma X-ray tube according to claim 1, wherein said X-ray target is formed of a thin layer or foil of a material having a high atomic number.

13. Plasma X-ray tube according to claim 1, wherein said material having a high atomic number is from the group consisting of gold and uranium.

14. Plasma X-ray tube according to claim 1, wherein said target is an electron-transparent outlet slit of an electron gun.

15. Method for generating X-radiation, in a plasma X-ray tube with high electron current densities including a plasma chamber formed of a metal hollow cathode with an X-ray target and a metal acceleration grid, an ignition electrode and an anode in the plasma chamber, an acceleration chamber, and an acceleration cathode in the acceleration chamber, which comprises varying acceleration voltage and current by varying current in the hollow cathode and gas pressure, without changing their electrical excitation data.

16. Method according to claim 15, which comprises effecting both low-pressure gas discharges and acceleration of charge carriers in pulsed operation.

17. Method according to claim 16, which comprises effecting the low-pressure gas discharges through ignition wire discharge and hollow cathode discharge.

18. Plasma X-ray tube with high electron current densities, comprising (a) a plasma chamber formed of a metal hollow cathode having walls including an outer wall with an X-ray target and an inner wall with at least one metal acceleration grid being highly transparent to electron and ion radiation and aligned along a path with said X-ray target;

(b) at least one ignition electrode in the form of a thin wire protruding into said plasma chamber;

(c) at least one anode disposed in one of said walls laterally of said path;

(d) an acceleration chamber adjoining and communicating with said plasma chamber through said acceleration grid and having metal walls connected with said walls of said plasma chamber, and an acceleration cathode with a head aligned with said path and spaced from said acceleration grid and a shaft in a wall of said acceleration chamber facing said acceleration grid.

* * * * *

UNITED STATES PATENT OFFICE
CERTIFICATE OF CORRECTION

PATENT NO. : 4,955,045

DATED : Sep. 4, 1990

INVENTOR(S) : Friede et al

It is certified that error appears in the above-identified patent and that said Letters Patent is hereby corrected as shown below:

Column 1, Line 36,     "thermionic"
    should read    -- glow --;
    Line 39        "Cold"
    should read    -- Field --;

Column 4, Line 1,     "applying to both"
    should read    -- or V applying to the --;
    Line 2,        "$U_B$ and $U_X$."
    should read    -- $U_B$ and $U_X$, respectively. --;
    Line 9,        delete "partial";

Column 6, Line 40,     "negative"
    should read    -- low --.

Signed and Sealed this

Thirty-first Day of March, 1992

Attest:

HARRY F. MANBECK, JR.

*Attesting Officer*      *Commissioner of Patents and Trademarks*